(12) United States Patent
Ben-Menachem et al.

(10) Patent No.: US 6,460,437 B2
(45) Date of Patent: Oct. 8, 2002

(54) PRECISION DOUBLE-SIDED ASPHERIC ELEMENT

(75) Inventors: Baruch Ben-Menachem, Maale Adumim; Yaacov Zerem, Jerusalem; Nissim Asida, Nof-Eilon, all of (IL)

(73) Assignee: Ophir Optronics Ltd., Jerusalem (IL)

(*) Notice: Subject to any disclaimer, the term of this patent is extended or adjusted under 35 U.S.C. 154(b) by 0 days.

(21) Appl. No.: 09/878,809

(22) Filed: Jun. 11, 2001

(65) Prior Publication Data

US 2001/0029816 A1 Oct. 18, 2001

Related U.S. Application Data

(62) Division of application No. 09/315,423, filed on May 20, 1999.

(30) Foreign Application Priority Data

May 21, 1998 (IL) .................................................. 124598

(51) Int. Cl.[7] .............................. B23B 41/04; B23B 1/00
(52) U.S. Cl. .............................. 82/1.3; 82/1.4; 82/1.11; 269/21
(58) Field of Search .............................. 82/1.11, 12, 13, 82/1.3, 1.4, 11.3, 11.4, 46; 269/21; 279/3

(56) References Cited

U.S. PATENT DOCUMENTS

| 3,497,577 A | 2/1970 | Wichterle |
| 3,763,597 A | 10/1973 | Schlotfeldt |

(List continued on next page.)

FOREIGN PATENT DOCUMENTS

| EP | 0309075 | 3/1989 |
| EP | 0341868 | 11/1989 |
| EP | 0441206 A1 | 8/1991 |
| EP | 0441206 B1 | 3/1996 |
| WO | 9918455 | 4/1999 |
| WO | 9938033 | 7/1999 |

OTHER PUBLICATIONS

Predesign of Diamond turned Refractive/Diffractive Elements for IR Objectives by Max J. Riedl; Published in SPIE Proceedings, Critical Review, vol. CR41, entitled "Lens Design" edited by W.J. Smith, 1992 (OFC Diamond Turning Division, Keene, New Hampshire, USA).

P.R. Hall, "Use of Aspheric Surfaces in Intra-Red Optical Designs", published in Optical Engineering, vol. 26, pp. 1102–1111, Nov. 87.

Rank Pneumo, Inc., "Diamond Matching: Cost–Effective Route to Precision Optics", The Photonics Design and Applications Handbook, 1996, pp. H–487—H–490.

P.R. Hall, "The Use of Aspheric Surfaces in Lens Design", pp. 3–1 DM—3–8DM.

*Primary Examiner*—Henry Tsai
(74) *Attorney, Agent, or Firm*—Baker Botts L.L.P.

(57) ABSTRACT

A precision optical element is described, such as is used in thermal imaging systems in the infra-red, manufactured by means of single point machining, with both of its surfaces having an aspheric form, with or without the addition of a diffractive optics pattern. The element is produced while held in a novel vacuum chuck, whose support surface has a width in the radial direction significantly less than the size of the element, and which is aspherically machined to match the aspheric first surface of the element. A method whereby such an element can be produced-by-means of single point machining, such as diamond turning or fly cutting, is also described. Also described are new optical system designs and applications using such double-sided aspheric elements, thereby providing significant improvement over currently available optical systems.

7 Claims, 4 Drawing Sheets

U.S. PATENT DOCUMENTS

| | | |
|---|---|---|
| 4,084,458 A | 4/1978 | Gallery |
| 4,088,312 A * | 5/1978 | Frosch et al. .................. 269/21 |
| 4,184,292 A | 1/1980 | DeFazio et al. |
| 4,391,511 A * | 7/1983 | Akiyama et al. ............. 355/40 |
| 4,449,792 A | 5/1984 | Abe et al. |
| 4,592,684 A | 6/1986 | Baker |
| 5,042,935 A * | 8/1991 | Logan et al. ............... 351/159 |
| 5,044,706 A | 9/1991 | Chen et al. |
| 5,087,115 A | 2/1992 | Ishibai et al. |
| 5,365,377 A | 11/1994 | Sato |
| 5,386,315 A | 1/1995 | Amon et al. |
| 5,475,537 A * | 12/1995 | Kobayashi et al. ......... 359/794 |
| 5,583,698 A * | 12/1996 | Yamada et al. .............. 359/687 |
| 5,615,051 A | 3/1997 | Takato |
| 5,616,051 A | 4/1997 | Rogers et al. |
| 5,638,212 A | 6/1997 | Meyers et al. |
| 5,642,229 A * | 6/1997 | Kaneko et al. ............. 359/649 |
| 5,668,671 A * | 9/1997 | Erdmann .................... 359/716 |
| 5,689,373 A | 11/1997 | Takato |
| 5,715,031 A | 2/1998 | Roffman et al. |
| 5,726,799 A * | 3/1998 | Abe et al. ................... 359/431 |
| 5,738,165 A | 4/1998 | Imai |
| 5,914,821 A | 6/1999 | Chen et al. |
| 5,969,864 A | 10/1999 | Chen et al. |
| 6,122,999 A | 9/2000 | Durazo et al. |

* cited by examiner

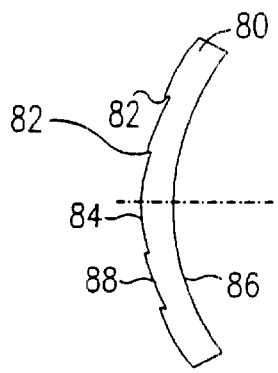
FIG. 6
FIG. 7
PRIOR ART
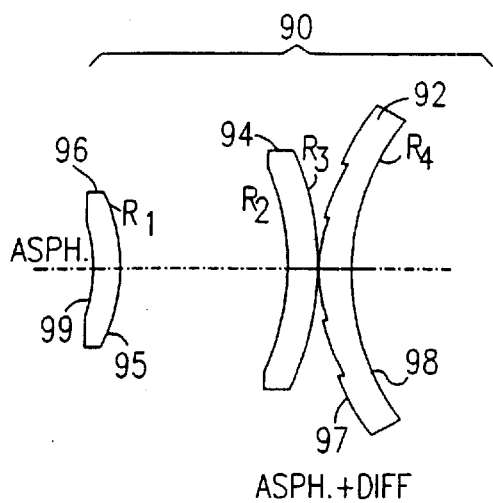
ASPH.+DIFF
FIG. 8
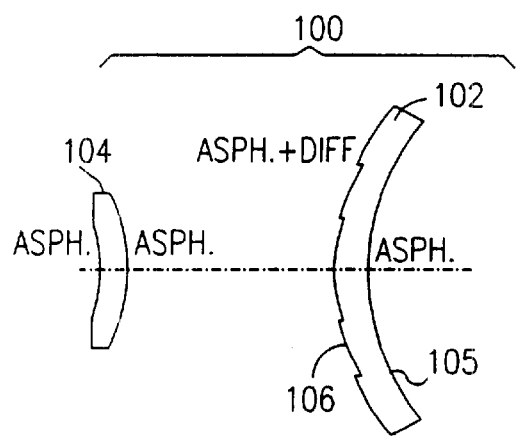

PRECISION DOUBLE-SIDED ASPHERIC ELEMENT

The application is a divisional application Ser. No. 09/315,423 filed May 20, 1999.

FIELD OF THE INVENTION

The present invention relates to the field of precision aspheric optical elements, especially lenses, whose surfaces are produced by means of single point machining.

BACKGROUND OF THE INVENTION

Optical imaging systems using conventional spherical lenses generally require a large number of surfaces, and hence a large number of elements, in order to correct for optical aberrations present in the system, and thereby to improve the image quality. In principle, if the number of elements is unlimited, the optical system designer can propose spherical lens assemblies which can, in almost every case, simultaneously correct for all of the common optical aberrations in a lens system of any desired f-number. However, the number of surfaces required to do this may be so high that the resulting lens assembly is excessively large in size and weight, and expensive to produce. Furthermore, because of the residual reflections from each surface, and the bulk absorption in each lens, the transmission of the complete lens assembly may be unduly reduced.

The use of aspheric surfaces, with or without the incorporation of diffractive elements, allows the design and construction of lens assemblies with the same or even better optical performance than an equivalent all-spherical system, but in most cases, with a significant reduction in the number of elements required, and therefore a significant improvement in the overall lens assembly size, weight, cost and optical transmission. In many cases, each aspherical surface in an optical system can be used to replace at least two spherical surfaces. This advantage becomes particularly important in the construction of lens systems for use in thermal imaging systems, such as those which operate in the 8 to 12 micron or the 3 to 5 micron wavelength regions. In order to increase the sensitivity of such systems, the lenses used often have large apertures of the order of several inches. Furthermore, of the materials available for use in these spectral regions, such as germanium, CVD-grown zinc selenide or zinc sulphide, silicon, gallium arsenide, calcium fluoride, and others, some are very expensive, and savings engendered by a reduction in the number of elements, both in material costs and in production and coating costs. are therefore a very significant factor in reducing total system cost. These savings usually outweigh the additional cost of production of the aspheric surfaces.

There are three main methods of producing aspheric surfaces on optical lenses. For the production of low precision aspheric optical elements for use in the visible or near infra-red, aspheric elements are made by casting or molding materials such as glass or optical grade polymers. Because the molds are so expensive to manufacture, such lenses have been used in mass produced optical equipment such as still and video cameras, and in optical disc readers, such as video disc players and optical memory discs. Such lenses generally contain aspheric elements with one side aspheric and the other side plane or spherical.

A number of patents have recently been granted for inventions which use mass produced lenses with both surfaces of aspherical form. In what is possibly the earliest such patent, U.S. Pat. No. 4,449,792 to N. Arai, S. Ishiyama and T. Kojima, a large aperture single lens is described having both surfaces aspheric. The lens is designed for use as the pickup lens in a video disk reader, and is made of plastic to make it lightweight. A similar lens has been described by M. Koboyashi, K. Kushida and N. Arai, in U.S. Pat. No. 5,475,537. An optical system with improved performance is described, for use in recording and reading information at visible or near infra-red wavelengths on an optical information medium. The system uses a double-sided aspheric objective lens for the imaging function. This lens is described as being made of glass or of "resin", the resin presumably being a transparent optical grade plastic material. In U.S. Pat. No. 5,583,698 to K. Yamada et al, is described a double aspheric lens for use in a video camera zoom lens. In U.S. Pat. No. 5,642,229 is described a double-aspheric lens for use in a projection lens unit, while in U.S. Pat. No. 5,726,799, a double aspheric lens is described for use in the viewfinder of a compact camera.

All of the above patents describe double aspheric lenses made of glass or plastic materials, and for use in the visible or near infra-red. These are suitable materials from which lenses can be manufactured at low cost, by casting or by molding. Though it is possible to manufacture a mold which will produce high precision cast or molded double aspheric lenses, the system requirements of such lenses are not usually high enough to warrant the cost of such precision. Molding or casting are therefore used, in general, to provide elements with sufficient precision for the requirements of such comparatively low cost, mass produced systems.

Almost all of the optical elements in optical imaging systems for use in the thermal infra-red region are made of materials which cannot be easily cast or molded, if at all. More important, even if they could be manufactured by these methods, the optical precision in these imaging systems is such that the precision afforded by these methods, at a reasonable manufacturing cost, generally falls far short of the system requirements, Maximum surface peak-to-valley irregularities of the order of $\lambda/2$ at the red HeNe wavelengths (0.63 $\mu$m) are required in the elements of many such systems to ensure adequate performance. The accuracy of optical surfaces are often measured by using the interference fringes of red HeNe laser light, and for this reason, a description of accuracy in terms of wavelengths of red HeNe laser light is used throughout this specification and is also thus claimed.

The second production method for producing aspheric surfaces are specialized variations of conventional polishing techniques, wherein position dependent pressure is applied to the polishing pad to produce the aspheric form. This method is very labor intensive, and can generally only be used to produce slight asphericity. Recently, automated machines for performing such polishing have been developed.

On an industrial scale, the current almost universally used method of producing the aspheric surfaces of such precision elements, especially those for thermal imaging systems, is by means of turning with a single crystal diamond tool, on a special purpose, ultra-high precision, vibration-free lathe, whose spindle runs at medium to high speeds in air bearings, and which generally uses laser metrology in order to measure the progress of the work. Such diamond turning lathes are capable of accuracies of better than 25 nanometers, and can produce an optical surface of sufficiently high quality for use in the elements of such thermal imaging systems. The cutting tool used is generally a single crystal diamond, specially shaped to provide a smooth cut, though other suitable single point turning tools may also be used. The aspheric profile is obtained by suitable CNC control of the motion of the single point cutting tool relative to the workpiece. Diamond machining can be efficiently applied for small or large production quantities, and for many of the currently used infra-red materials, and others. Furthermore, diamond cutting technology can be used for cutting diffractive patterns in addition to the aspheric surface, thereby further increasing the optical performance of the element.

Single point machining of precision optical elements is also used in a fly cutting configuration, wherein the workpiece is substantially static and the cutting tool is rotated at high speed over the element to provide the machining cut. The desired surface profile is obtained by suitable CNC control of the relative motion between the cutting tool holder and the element being produced. Fly cutting is often used in order to produce precision elements without an axis of rotational symmetry, such as precision cylindrical or elliptical surfaces on mirrors or on transmissive elements. Throughout this patent, the use of the term aspheric is understood also to include such cylindrical or elliptical surface shapes. In addition, flat surfaces are also commonly prepared by means of fly cutting.

Throughout this patent, the use of terms such as "turning", "machining", "single point machining", "fly cutting", "diamond turning" or "diamond machining" or their equivalents, which may have been used interchangeably, are all understood to mean forms of very high precision surface material removal using a sharp tool to produce an optical quality surface, whether strictly termed turning, machining, milling, or any other similar surface material removal technology, and whether the tool is of diamond or of any other suitable material.

However, up to now, it has been possible to produce elements with only one aspheric surface using diamond turning. The second surface has to be either planar or spherical. This has limited the ultimate usefulness of aspheric surfaces in the art of optical design for the thermal infra-red region, since present optimal designs may still require a larger number of lenses than would be required if lenses with both surfaces aspheric were available.

The reason that precision lenses can currently be produced with only one surface aspheric is an outcome of the methods currently available for holding the workpiece during machining and for testing the holder. The element must be tightly held during machining, yet without imposing any internal stresses. This is done using a vacuum chuck, with the rear surface of the workpiece in intimate contact with the chuck surface. The chuck has a diameter at least as large as that of the element itself, and the vacuum is delivered to the rear surface of the element by means of a series of circular grooves cut in the chuck surface. The use of vacuum chucking, which pulls the rear surface of the workpiece onto the chuck surface, is an important factor in supporting the workpiece without stress. If the workpiece were mechanically clamped at its edge, as in conventional turning or fly cutting, it would be under deformation while being worked, and though perfectly formed while in the chuck, it would spring back on release to its unstressed position, thereby losing its precision form.

In addition, in order to ensure stress free seating of the workpiece in the chuck, the chuck surface itself is made to optical quality. In the words of P. R. Hall in the article entitled "Use of aspheric surfaces in infra-red optical designs" published in Optical Engineering, Vol. 26, pp. 1102–1111 (November 1987), the disclosure of which, and of all documents cited therein, are hereby incorporated by reference, "It is an essential feature of diamond machining that the workpiece is chucked on reference surfaces that have been cut by the machine." The chuck surface itself is therefore made by diamond turning, if spherical, or, by diamond fly cutting if flat. The rear surface of the workpiece is then given an optical surface of identical mating shape, so that it sits in the chuck stress-free.

The main reason that only flat or spherical chucking surfaces are currently used arises from the fact that even in a well produced batch of aspheric surfaces, each one has slightly different surface irregularities, to a much greater degree than conventionally polished spherical surfaces. Therefore, even if an accurate aspheric chuck were made, each aspherically produced first surface would sit slightly differently in the chuck, and would prevent accurate machining of the second surface.

A secondary reason which has prevented the use of aspheric chucks, arises from the need to test the accuracy of the chuck surface being turned or cut while it is still on the diamond turning or fly-cutting machine. This is necessary so that figure corrections can be made in successive cuts, in order to obtain a highly accurate final cut. This testing is done by looking for the interference fringes between the worked surface and a suitable test glass using monochromatic light. Since aspheric test glasses are considerably more difficult to produce than spherical ones, up to now, only spherical or flat chucks have been generally produced.

There exist other methods of measuring the power and irregularity of an aspheric surface of the chuck, such as with a profile measurement instrument such as the Rank Talysurf manufactured by Rank Taylor Hobson of Leicester, England. Use of this instrument is not feasible for two reasons. Firstly, the presence of the vacuum grooves in the chuck surface interfere with the measurement, and these grooves must be cut before the surface is finished, as otherwise, cutting the grooves would distort the finished surface. Secondly, the Talysurf can only be used while the surface under test is off the machine, and removal and replacement of the chuck between testing off-line and machining would effectively degrade the accuracy of the whole machining process.

In the above-mentioned article by P. R. Hall (op. cit.), which compares a number of aspherically designed lens systems with equivalent systems designed using only spherical lenses, the author always refers to the addition of one aspherical surface per element, and of a second aspherical surface being added only to a second element.

Similarly, in U.S. Pat. No. 5,668,671 to M. Erdmann, assigned to British Aerospace plc, one of the leaders in the field of diamond turned lens design and production, there is described a dioptric imaging lens system for use in the thermal infra-red region. The lens elements are made of germanium and silicon, presumably with any aspheric surfaces diamond-turned to provide the precision required for the application. The only aspheric lens described or claimed therein, has only one of its surfaces aspheric.

There therefore exists a need for double-sided precision aspheric lenses, with or without the addition of diffractive patterns, especially for use in the thermal infra-red region, for improving the transmission and imaging performance of such optical systems.

The disclosures of all publications and patents mentioned in this section and in the other sections of the specification, and the disclosures of all documents cited in the above publications and patents, are hereby incorporated by reference.

SUMMARY OF THE INVENTION

The present invention seeks to provide a new precision optical element with both surfaces of aspheric form, with or without the addition of a diffractive pattern on either or both surfaces. The present invention also seeks to provide a method whereby such an element can be produced by means of single point machining, such as diamond turning or fly cutting. In addition, the present invention seeks to provide a novel vacuum chuck for holding such an optical element in order to carry out this method. Furthermore, the present invention seeks to provide new optical system designs and applications using such double-sided aspheric elements, thereby providing in many cases, significant improvement over currently available optical systems.

Precision lenses with both surfaces aspheric, with or without the addition of a diffractive pattern on one or both of the surfaces, would enable many optical systems to be designed and constructed with an even smaller number of elements than currently used, with concomitant further savings in cost, size and weight, and further improvement in system performance in terms of transmission and image quality. There are two specific situations where the use of lenses with both surfaces aspheric would provide significant advantages:

(1) Optical designs which require the use of a thick lenses, or of lenses with high refractive indices, which is indeed the case for many infra-red materials.

(2) Optical designs which would require the use of a surface with a very steep aspheric curvature. Such a surface is expensive and difficult to manufacture. The use of an element with both surfaces aspheric would enable the aspheric curvature to be divided between the two surfaces, thus simplifying the manufacture and testing of the element.

Modern thermal imaging systems, which use large numerical apertures in order to achieve high efficiency, are often designed to use lenses of the above two types. The use of double-sided precision aspheric lenses, with or without the addition of a diffractive pattern too, would therefore significantly improve the transmission and imaging performance of such optical systems, especially those for use in the thermal infra-red region.

There is thus provided in accordance with a preferred embodiment of the present invention, a precision optical element, such as is used in thermal imaging systems in the infra-red, manufactured by means of single point machining, with both of its surfaces having an aspheric form. The element is produced while held in a novel vacuum chuck, according to another preferred embodiment of the present invention, in which the support surface for the element is in the form of an aspherically machined ring or other shape, of width in the radial direction significantly less than the radius of the element, and whose form is matched to the aspheric first surface of the element to be chucked for machining. This is in contrast to prior art chucks, which support the whole of the element's surface. In this way, the effect of inaccuracy in the aspheric machining of either the chuck support surface, or the rear surface of the element being machined, is reduced, and an accurate aspheric surface can be cut on the second side also.

In accordance with another preferred embodiment of the present invention, there is further provided a method of single point turning precision aspheric elements with both surfaces aspheric, and comprising the steps of forming the first aspheric surface on the element, forming the support surface of a vacuum chuck of the type described above, such that it has an aspheric surface matched to the first aspheric surface formed on the element, and subsequently machining the second aspheric surface on the element while it is held by its first aspheric surface in the vacuum chuck.

In accordance with yet another preferred embodiment of the present invention, there are further provided novel optical systems using double-sided aspheric elements according to the present invention, with a smaller number of elements than previously available prior art systems, and hence with lower volume, weight and production costs, as well as higher optical transmission and improved imaging performance.

In accordance with further preferred embodiments of the present invention, there is provided a precision optical element including first and second aspheric surfaces, at least one of which is produced by single point machining, or a precision optical element as above wherein both surfaces are produced by single point machining.

In accordance with a further preferred embodiment of the present invention, there is also provided a precision optical element as described above, and wherein the single point machining is executed by means of a diamond tool.

In accordance with still another preferred embodiment of the present invention, there is provided a precision optical element according to any of the previous claims, and wherein the precision of at least one of the first and second surfaces is such that the maximum peak to valley irregularity is less than one wavelength of red Helium Neon laser light.

Furthermore, in accordance with more preferred embodiments of the present invention, there is provided a precision optical element as described above, and wherein the element is a lens, or a double-sided mirror.

There is even further provided in accordance with a preferred embodiment of the present invention, a precision optical element as described above, which may be made of an infra-red transparent material, such as germanium, zinc selenide, zinc sulphide, silicon, gallium arsenide, calcium fluoride, or similar infra-red transmissive materials.

There is also provided in accordance with a further preferred embodiment of the present invention, a precision optical element as described above, and wherein the element also has a diffractive optics pattern turned on at least one of its surfaces.

There is provided in accordance with a still further preferred embodiment of the present invention, a vacuum chuck for holding a precision optical element which has a radial dimension and a first aspheric surface, during single point machining of a second aspheric surface thereon, and including a support surface of width significantly smaller than the radial dimension of the element, the support surface having an aspheric form matching that of the first aspheric surface of the element. Furthermore, in accordance with yet more preferred embodiments of the present invention, there is provided a vacuum chuck as described above, and wherein the volume inside of the support surface, meaning the space enclosed within the perimeter of the support surface, accommodates a vacuum, or a vacuum chuck as described above and which also includes at least one passage within the support surface, which accommodates a vacuum.

Furthermore, in accordance with yet another preferred embodiment of the present invention, there is provided a vacuum chuck as described above, and operative to hold the element during single point machining.

There is also provided in accordance with a further preferred embodiment of the present invention, a vacuum chuck for holding a precision optical element during single point fly cutting, and including a support surface of width substantially smaller than the linear dimensions of the surface of the element, the support surface having an aspheric form.

In accordance with yet another preferred embodiment of the present invention, there is provided a method of producing first and second aspheric surfaces on a precision optical element having a radial size, by means of single point machining, and including the steps of forming the first aspheric surface on the element, also forming on a vacuum chuck, a support surface of width in the radial direction significantly smaller than the radial size of the element, and having an aspheric form matched to the first aspheric surface formed on the element, and subsequently machining the second aspheric surface on the element while it is held by the first aspheric surface in the support surface of the vacuum chuck.

In accordance with a further preferred embodiment of the present invention, there is also provided a method of producing first and second aspheric surfaces on a precision optical element as described above, and wherein the first aspheric surface of the element is formed by machining.

In accordance with another preferred embodiment of the present invention, there is provided a method of producing first and second aspheric surfaces on a precision optical element as described above, and wherein the support surface of the vacuum chuck is formed by machining.

There is further provided in accordance with still another preferred embodiment of the present invention, a method of producing a double-sided aspheric optical element as described above, and also comprising the step of machining a diffractive optics pattern on at least one of the surfaces.

In accordance with another preferred embodiment of the present invention, there is provided a method of producing first and second aspheric surfaces on a precision optical element as described above, and wherein the precision of the optical element is such that the maximum peak to valley irregularity of at least one of its first and second surfaces is less than one wavelength of red Helium Neon laser light.

There is provided in accordance with a still further preferred embodiment of the present invention, an optical system including at least one precision optical element comprising two aspheric surfaces, at least one of which is produced by single point machining.

There is even further provided in accordance with a preferred embodiment of the present invention, an optical system as described above, and wherein the at least one precision optical element also comprises a diffractive optics pattern on at least one surface.

There is even further provided in accordance with a preferred embodiment of the present invention, an optical system as described above, and wherein the precision of the at least one optical element is such that the maximum peak to valley irregularity of at least one of its first and second surfaces is less than one wavelength of red Helium Neon laser light.

In accordance with other preferred embodiments of the present invention, the optical systems mentioned above may be used in thermal imaging applications.

Throughout this specification, the use of the term "lens" is taken to include any optical element whose entry and exit surfaces have been given curvatures, such that the element has positive or negative focusing power, whether the "lens" is in the form of a lens, a wedge, a prism, a plate, or any other optically useful shape.

Furthermore, it is appreciated that the scope of the invention is not limited to double sided aspheric elements manufactured by single point diamond turning or fly cutting, but to such elements manufactured by any machining technique requiring the use of the methods described herein, wherein the precision is such that the maximum surface peak-to-valley irregularity of the element is one wavelength (two fringes) at the red HeNe wavelength (0.63 $\mu$m).

BRIEF DESCRIPTION OF THE DRAWINGS

The present invention will be understood and appreciated more fully from the following detailed description, taken in conjunction with the drawings in which:

FIG. 6 shows a double-sided diffractive element, constructed and operative according to a preferred embodiment of the present invention, formed on a double-sided aspheric lens such as that shown in FIG. 3.

FIG. 7 shows a prior art optical system for use as a thermal imaging lens, designed using prior art aspheric lenses with only one surface per lens of aspheric form.

FIG. 8 shows an optical system performing the same function as the prior art system in FIG. 7, but designed using lenses with both surfaces aspheric, as produced by the method of the present invention.

DETAILED DESCRIPTION OF PREFERRED EMBODIMENTS

Figure 1:
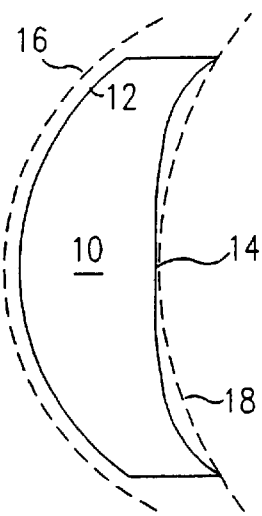
FIG. 1 is a pictorial illustration of a prior art aspheric element constructed according to the previously available technology, with only a single aspheric surface.

Reference is now made to FIG. 1, which illustrates schematically a prior art aspheric element 10, manufactured according to single point turning techniques hitherto available. The element could be a lens, a double-sided mirror or any other suitable double sided optical element, but in this preferred embodiment, a lens example is described. For use in an infra-red thermal imaging system, operating in the 8 to 12 $\mu$m or the 3 to 5 $\mu$m wavelength region, the lens may be made of a suitable material of the infra-red transmissive materials, such as polycrystalline or single crystal germanium, or CVD-grown zinc selenide or zinc sulphide, or gallium arsenide, silicon, or others. The first surface of the lens 12, which is the surface chucked in the machine, has a spherical form, as shown by the dotted arc of a circle 16. This surface is typically made by conventional lens grinding and polishing techniques. The opposite and second surface 14, which before diamond turning also had a spherical form, typically made by conventional grinding and polishing techniques, has been turned to an aspheric form. The departure from spherical form, which is indicated by the dotted arc of circle 18, may range from small fractions of a millimeter, to as much as a few millimeters in highly aspheric lenses. The spherical surface shown in FIG. 1 is known as the "best fit sphere", and touches the desired aspheric surface at the center and at the circumference. The use of the best fit sphere as the starting profile of the lens, reduces to a minimum the amount of material to be removed by the diamond turning process.

Figure 2:
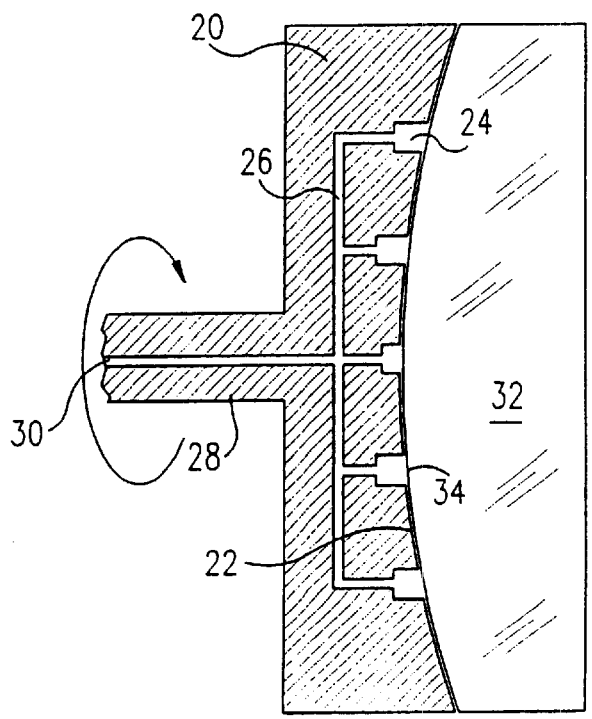
FIG. 2 shows a prior art vacuum chuck such as is used to hold a prior art aspheric element during single point machining of its single aspheric surface.
Figure 2:
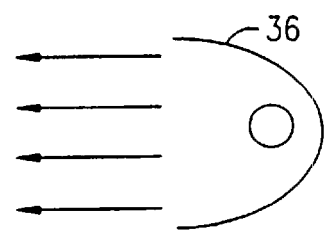

FIG. 2 shows a cut-away illustration of a prior art vacuum chuck, such as that used to turn the spherical surface of the prior art element shown in FIG. 1. The body of the chuck 20 is typically made of aluminum. A number of circular grooves 24 have been machined in the front surface 22, typically by conventional turning. These grooves are operative to contain the vacuum which holds down the lens to be diamond turned. The vacuum is conveyed to these grooves by means of internal passageways 26, fed from a central vacuum feed 30 through the center of the chuck spindle 28. After the vacuum grooves have been machined, the front surface of the chuck 22 is diamond turned to a spherical form with optical precision. The accuracy of the front surface form is ascertained by observing, with the aid of illumination from a monochromatic source 36, the interference fringes formed between a test glass 32 with the desired radius of curvature 34, and the diamond turned spherical front surface 22 of the chuck.

After the chuck surface has been accurately formed, the element 10 shown in FIG. 1 is mounted in the chuck by its matching spherical first surface 12, and the second surface 14 is diamond turned to the required aspheric form. A chuck for holding an element during fly cutting would have similar structure, and would be used in a similar way, except that the center of the chuck need not have a spindle, since the chuck does not need to rotate.

Figure 3:
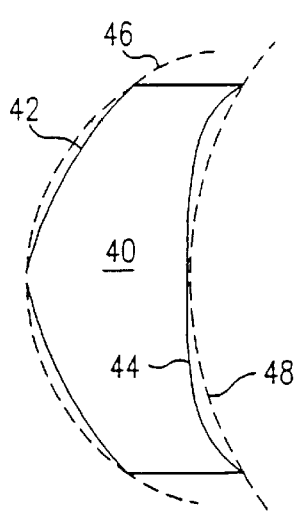
FIG. 3 shows a double-sided, single point turned aspheric lens, constructed and operative according to a preferred embodiment of the present invention.

FIG. 3 shows a double-sided aspheric element 40, constructed and operative according to a preferred embodiment of the present invention. The element could be a lens, a double-sided mirror, or any other suitable double-sided element. This element is of similar shape and dimensions to the prior art element shown in FIG. 1, but differs in that both of its surfaces 42, 44, have been given aspheric forms by single point turning. The departure of both of the surfaces from spherical symmetry is illustrated schematically by the dotted spherical cross sections 46, 48, which are the best fit spheres to which the surfaces were polished before diamond turning.

Figure 4:
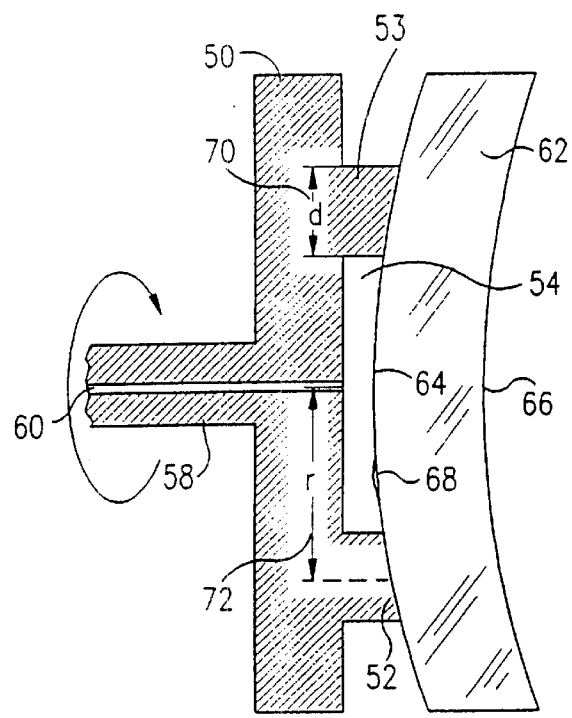
FIG. 4 shows a vacuum chuck with a narrow support ring, operative according to another preferred embodiment of the present invention. This chuck is used to produce a precision double-sided aspheric element such as that shown in FIG. 3.

FIG. 4 shows a vacuum chuck 50, constructed and operative according to a preferred embodiment of the present invention, wherewith a precision double-sided aspheric element, such as that shown in FIG. 3 may be constructed. The chuck differs from prior art chucks previously used, as shown in FIG. 2, in that a large part of the chucking surface has been cut away, leaving only a comparatively narrow ring 53 with a support surface 52 against which the element 62 being turned is vacuum held. The vacuum is formed in the volume 54 within the ring 53, and is fed from a central vacuum feed 60, through the center of the chuck spindle 58, in a similar manner to that of the prior art chuck shown in FIG. 2. The width d, 70, of the mounting ring 53, and its relative circumferential position r, 72, are chosen such that the element 62 being turned is held firmly but without introducing stresses and deformations into the element 62. These parameters are a function of the material, diameter and thickness of the element 62. In the chuck shown in FIG. 4, the ring 53 is set at a mean radius r, 72, about two thirds of the element's radius, and the ring radial width d, 70, is about 15% of the radius of the element.

As with the prior art chuck shown in FIG. 2, if the chuck of FIG. 4 is to be used for fly cutting, the central spindle 58 is inoperative and may be optionally omitted, since the chuck need not rotate. Furthermore, for all of the mentioned applications, whether for turning, fly cutting or for any other cutting method, the support surface does not have to be a ring, but can be of any suitable shape which correctly supports the element. The term "ring" is thus used throughout this specification, and is also claimed, to refer to any such shape.

The element 62 is to be formed with both its first surface 64, and its second surface 66 aspherically turned. As with the prior art chucks, the mating surface 52 of the mounting ring 53 of the chuck according to the present invention, is precision single point turned to the exact form of the first surface 64 of the element 62 mounted therein. Unlike prior art chucks, however, the mating surface 52 is turned to an aspheric form, to match the aspheric form of the first surface 64 of the lens being produced. However, because the mating surface 52 of the mounting ring and the first surface 64 of the element are only in contact over a small part of their complete area, sufficient seating accuracy is obtained if reliance is made on the accuracy of the single point turning itself. This obviates the need to test the accuracy of the turned surface with a test glass, and then to make repeated small correction cuts until the desired form is obtained over the whole contact area. As a result of the use of a ring chuck according to the present invention, small form inaccuracies in the chuck surface 52 or in the element first surface 64, which in a prior art, full area contact chuck, would cause the element to sit askew of the desired position, now, because of the smaller contact area, only introduce small deviations from the desired mounting position. With the element 62 held with its first aspheric surface 64 accurately seated in the chuck, the second aspheric surface 66 can than also be accurately turned.

As a result, the novel ring chuck according to this preferred embodiment of the present invention makes it possible for the first time to produce a precision element, such as a lens or a double-sided mirror, turned or fly cut to aspheric form on both of its surfaces.

According to a preferred method of producing an element such as a lens, according to the present invention, a lens blank 62 with first and second surfaces spherically formed, has its first surface 64 diamond turned to the desired aspheric form. This can be performed with the element mounted either in a prior art vacuum chuck, or in a ring vacuum chuck according to the present invention. The mounting ring surface 52 of a ring vacuum chuck is then diamond turned to an aspheric form complementary to that of the first aspheric surface 64 of the lens. The lens is then mounted in the ring chuck with its first surface 64 held on the aspheric ring surface 52 of the chuck. Because of the above mentioned novel features of this ring mounting chuck, the lens is mounted accurately, and without stress or deformation, and the second surface 66 of the lens can then be turned to its desired aspheric form.

In spite of the comparatively small chucking contact area used to mount the lens, and even though the vacuum clamping effect is operative only on the central part of the element and may have been expected to distort the element, it is found that the accuracy of an aspheric surface turned in a chuck using the dimensional criteria mentioned above and by the method of the present invention, is not degraded below the requirements for the surface form of such an element.

Ring vacuum chucks with a spherical mounting surface have been in limited use in the diamond turning industry, to hold a conventional prior art aspheric lens with one aspheric surface while diamond turning its aspheric second surface. Such ring chucks have been used to chuck lenses where the lens mounting surface may have some slight defects, such as that shown at point 68 in FIG. 4. This defect 68 has been shown schematically therein with a very exaggerated size. In practice, even a very faint defect, just visible to the naked eye, may be sufficient to prevent the lens from being accurately seated in a full form prior art chuck, as illustrated in FIG. 2, resulting in an inaccurately turned second surface. Such chucks have been used primarily by diamond machine manufacturers for demonstration and acceptance test purposes, as they allow multiple use on customers' trial parts, without detracting from the turning accuracy because of the poor quality of customer-supplied trial parts.

However, to the best of the inventors knowledge, such ring chucks have always been equipped with a spherically formed surface for holding the spherical first surface of an element, in order to turn the second surface to an aspheric form, as with the prior art vacuum chuck described above. Such ring chucks have never, to the best of the inventors' knowledge, been equipped with an aspheric surface, to enable the production of double-sided aspheric elements by the method described in the present invention.

If the chuck and method according to the present invention, are used for fly cutting, it is possible to produce lenses with both surfaces cylindrical or elliptical. In addition, since the fly cutting configuration is used for producing aspherical mirror surfaces, it now becomes possible to produce two sided mirrors, where both sides are cylindrical or elliptical.

Furthermore, since the element and chuck are static during fly cutting, and do not undergo circular motion, and the element to be machined is not necessarily circular in shape, the support ring of a chuck according to the present invention for fly cutting applications need not be of circular form at all. It may be of any form that maintains the chucking vacuum and supports the element on part of its first surface, without imparting stress which would distort the element.

Figure 5:
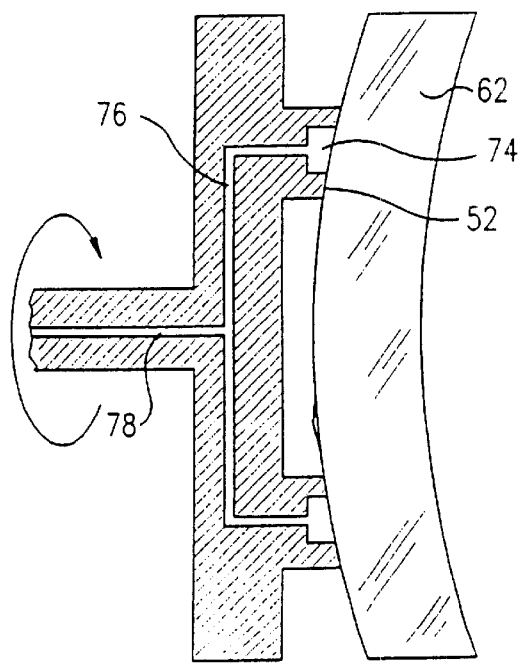
FIG. 5 shows a vacuum chuck similar to that shown in FIG. 4, but with the vacuum supplied to the element by means of grooves in the support surface.

FIG. 5 now shows a vacuum chuck according to another preferred embodiment of the present invention, but differing from that shown in FIG. 4 in that the vacuum which holds the element 62 is supplied through grooves 74 within the support surface, in a similar fashion to those in the prior art chuck shown in FIG. 2. Channels 76 lead from a central vacuum feed 78 to these grooves. Although the support surface 52 is narrow, and there is thus little room for more than one or two grooves, there is sufficient support with a chuck of this type to hold a light element during turning. As an alternative, the vacuum chuck could be constructed with the vacuum feeds shown in both FIG. 4 and FIG. 5, such that the element is held both from within the support ring, and by the support surface itself.

The vacuum ring chuck according to the present invention can also be used for producing double-sided diffractive optical elements. Diffractive optical element patterns are produced by machining, on the surface of the element, a diffractive structure, generally in the form of a number of concentric grooves or steps, with a defined profile, position and surface profile between the grooves or steps. This structure then adds diffractive and dispersive power to the element, and is used to further correct for residual aberrations present in the element. In this way, the optimum design benefit can be obtained from a single element. Diffractive optics patterns can be applied to any surface, whether flat, spherical or aspheric.

Generally, it is sufficient to apply the diffractive optics structure to one surface of the element only. Since it is necessary to use diamond turning to apply the diffractive grooves to the surface of most of the materials used in the thermal infra-red region of the spectrum, it is common practice to manufacture diffractive optics elements on the surface of aspheric elements themselves, as an additional stage to their production process. The procedure followed is thus to turn both the aspherical sagitta and the diffractive groove sagitta in one chucking position.

The diffractive optical elements available heretofore, have been manufactured with only one aspheric surface. The use of the vacuum ring chuck according to the present invention, and the use of the method of producing double-sided aspheric elements according to the present invention, also enable the production of double aspheric diffractive optical elements. The most commonly used diffractive optical element which can be produced according to a preferred embodiment of the present invention is a lens with one side simply aspheric but without a diffractive optics structure, and the second side aspheric and with a diffractive optics pattern. FIG. 6 is a schematic drawing of such a double aspheric sided diffractive optical element 80, according to a preferred embodiment of the present invention. The diffractive optics pattern has been formed only on one surface 88 of the element 80. In this example, two diffraction grooves 82 are shown, but the number may be different. The profile 84 of the surface of the element between the grooves is also part of the design of the diffractive element, and it too is produced by single point turning. Both surfaces of the element 86, 88 have their own overall aspheric form, besides the superimposed diffractive pattern 82 on one of the aspheric surfaces.

The vacuum ring chuck, as shown in the embodiments illustrated in FIG. 4 and FIG. 5, is designed so that the grooves do not fall within the area of contact of the chucking ring, so that the second aspherical side can be turned without damaging the groove structure. It is only essential to use the vacuum ring chuck of the present invention in the case where both sides of the lens have diffractive patterns. If only one side has such a diffractive pattern, then it would normally be cut on the second machined surface, to avoid the problem of having to chuck a surface with a diffractive pattern already on it. The use of such double-sided diffractive elements, whether the diffractive pattern is applied to one or both of the aspheric surfaces, gives the optical designer an additional degree of freedom in designing optical systems, with even further resulting improvements in system performance and cost.

FIG. 7 shows a prior art optical system for use as a thermal imaging lens assembly in the 8 to 12 μm spectral region. The design requirement is for a lens with an f-number of 0.8 and a wide Field of View. The lens assembly 90 is designed using prior art aspheric and diffractive lenses with only one surface per lens of aspheric or diffractive form. This applies a limitation to the design procedure, and as a result, the required design uses 3 lenses 92, 94, 96. The first lens has one aspheric/diffractive surface 97, and the other R4 spherical 98. The second lens 94 is a conventional spherical lens, with radii marked R2, R3. The final lens 96, has one aspheric surface 99, and the other surface R1 spherical 95.

FIG. 8 shows the same lens assembly according to a further embodiment of the present invention, designed with the additional freedom provided by the use of lenses with both surfaces aspheric, or with both surfaces aspheric and diffractive, as proposed in the present invention. FIG. 8 shows one optimized design for the required lens assembly. It is observed that the new lens assembly 100 has only two elements 102, 104. The first lens 102 is a double-sided aspheric/diffractive lens, with the first surface 105 aspheric, and the second surface 106 aspheric/diffractive, while the second lens is a double sided aspheric lens. The use of only two elements has enabled the lens assembly to be of smaller size, lower weight and reduced cost, as compared with the prior art three-element design. In addition, the new lens assembly shows improvements in system performance in terms of overall transmission and image quality for large fields of view.

Figure 9:
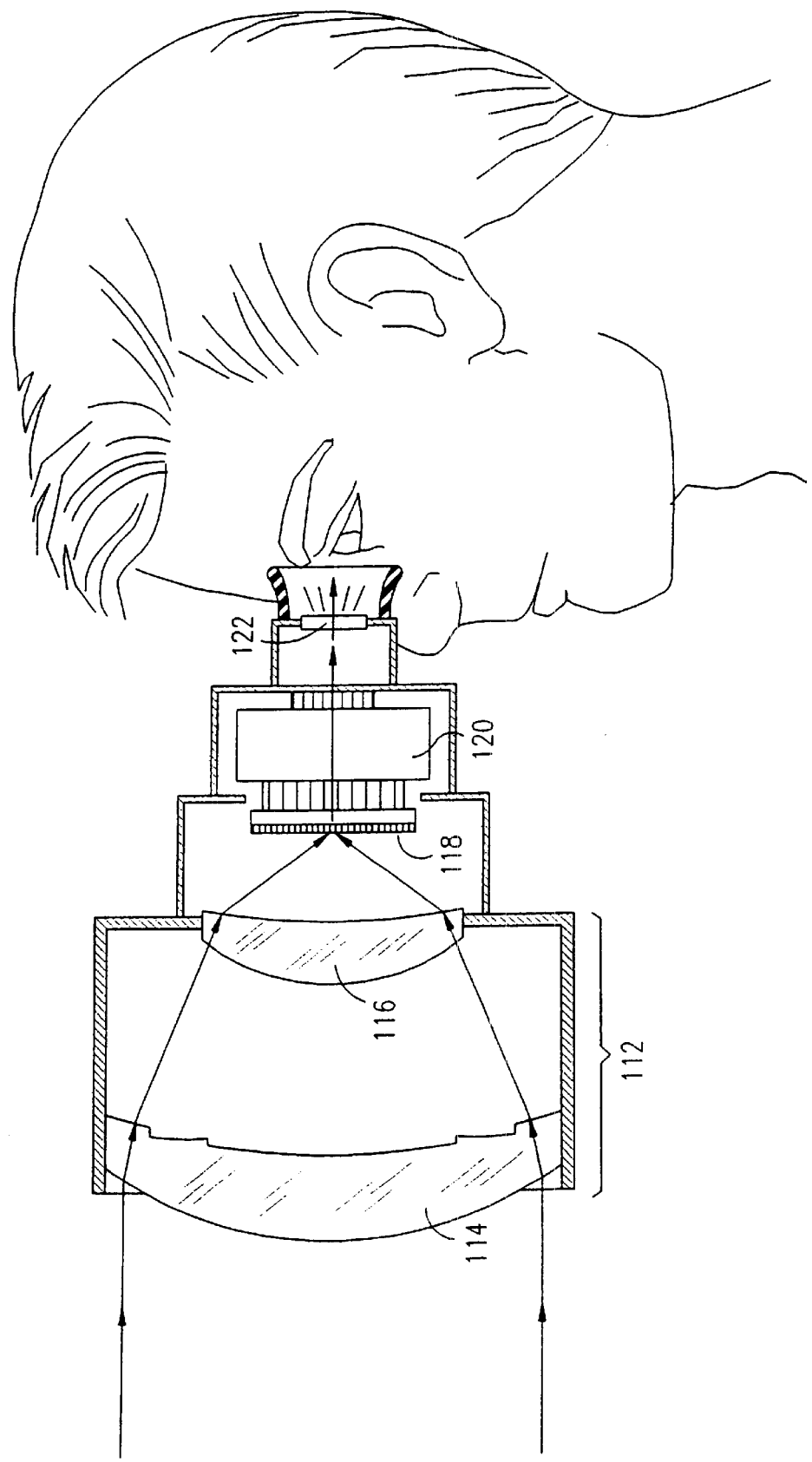
FIG. 9 shows an optical system for use in thermal imaging or FLIR applications, using double-sided aspheric lenses with a diffractive optics structure on one surface.

FIG. 9 shows an optical system for use in thermal imaging or FLIR applications, constructed and operative according to a further preferred embodiment of the present invention. This system is typical of optical systems which advantageously use double-sided aspheric lenses. The system 110 consists of an infra-red lens assembly 112 mounted on its front end, for imaging the field to be viewed. The lens assembly is similar to that shown in FIG. 8, and uses double-sided aspheric lenses 114, 116, one of which 114 has a diffractive optics pattern on one of its surfaces. This lens assembly has reduced size and weight and improved performance in comparison with prior art lens assemblies. The lens assembly forms a focused image on the focal plane array 118. The signals from this focal plane array 118 are processed by means of electronic signal processing circuits 120, and the resulting image is displayed on the screen 122, where the viewer can observe it. Since the lens assembly of a thermal imaging camera system has to be provided with a large numerical aperture, in order to collect the maximum possible amount of light, the lens assembly may represent a major part of the weight and size of the camera. Consequently, a thermal imaging system according to the present invention, using double-sided aspheric lenses with or without diffractive optics patterns thereupon, may be constructed considerably lighter and more compact than prior art systems.

The use of double-sided aspheric and aspheric/diffractive lenses according to the present invention therefore enables the construction of completely new precision optical systems, hitherto unattainable, showing significant improvements in optical efficiency and imaging performance, and lighter in weight and smaller in size.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A method of producing first and second aspheric surfaces on a precision optical element having a radius, comprising the steps of:

forming said first aspheric surface on said element;

forming on a vacuum chuck, a support surface being a ring having a width in its radial direction less than 50% of the radius of said element, and having an aspheric form matching that of said first aspheric surface formed on said element; and subsequently forming said second aspheric surface on said element while it is held with said first aspheric surface in said vacuum chuck.

2. A method of producing first and second aspheric surfaces on a precision optical element according to claim 1, and wherein at least one of said steps of forming said first aspheric surface and of forming said second aspheric surface of said element comprises a machining step.

3. A method of producing first and second aspheric surfaces on a precision optical element according to claim 1, and wherein said step of forming on a vacuum chuck a support surface comprises a machining step.

4. A method of producing first and second aspheric surfaces on a precision optical element according to claim 1, and also comprising the step of machining a diffractive optics pattern on at least one of said aspheric surfaces.

5. A method of producing first and second aspheric surfaces on a precision optical element according to claim 1, and wherein the precision of said optical element is such that the maximum peak to valley irregularity of at least one of said first and second surfaces is less than one wavelength of red Helium-Neon laser light.

6. A method of producing first and second aspheric surfaces on a precision optical element according to claim 1, and wherein the volume inside of said support surface of said vacuum chuck accommodates a vacuum.

7. A method of producing first and second aspheric surfaces on a precision optical element according to claim 1, and wherein said vacuum chuck comprises at least one passage within said support surface which accommodates a vacuum.

* * * * *

UNITED STATES PATENT AND TRADEMARK OFFICE
CERTIFICATE OF CORRECTION

PATENT NO.     : 6,460,437 B2                                              Page 1 of 1
DATED          : October 8, 2002
INVENTOR(S)    : Ben-Menachem et al.

It is certified that error appears in the above-identified patent and that said Letters Patent is hereby corrected as shown below:

<u>Title page,</u>
Item [57], ABSTRACT,
Line 10, "produced-by-means" should read -- produced by means --

<u>Column 1,</u>
Line 4, "divisional application" should read -- divisional of U.S. application --
Line 48, "costs." should read -- costs, --

Signed and Sealed this

Twenty-fifth Day of March, 2003

JAMES E. ROGAN
*Director of the United States Patent and Trademark Office*